(12) United States Patent
Li et al.

(10) Patent No.: US 12,176,559 B2
(45) Date of Patent: Dec. 24, 2024

(54) BATTERY CELL ASSEMBLY, BATTERY MODULE, AND BATTERY PACK

(71) Applicant: Contemporary Amperex Technology Co., Limited, Ningde (CN)

(72) Inventors: Zhenhua Li, Ningde (CN); Haizu Jin, Ningde (CN); Dongyang Shi, Ningde (CN); Ning Chen, Ningde (CN); Fei Hu, Ningde (CN); Yuanbao Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 694 days.

(21) Appl. No.: 17/419,697

(22) PCT Filed: Mar. 25, 2019

(86) PCT No.: PCT/CN2019/079584
§ 371 (c)(1),
(2) Date: Jun. 29, 2021

(87) PCT Pub. No.: WO2020/140334
PCT Pub. Date: Jul. 9, 2020

(65) Prior Publication Data
US 2022/0085448 A1    Mar. 17, 2022

(30) Foreign Application Priority Data
Dec. 30, 2018  (CN) .......................... 201822274884.6

(51) Int. Cl.
*H01M 50/213*     (2021.01)
*H01M 10/04*      (2006.01)
(Continued)

(52) U.S. Cl.
CPC ..... *H01M 50/213* (2021.01); *H01M 10/0431* (2013.01); *H01M 50/209* (2021.01);
(Continued)

(58) Field of Classification Search
None
See application file for complete search history.

(56) References Cited

U.S. PATENT DOCUMENTS

2016/0365552 A1    12/2016  Kato

FOREIGN PATENT DOCUMENTS

| CN | 106058089 A | 10/2016 |
|---|---|---|
| CN | 108899593 A | 11/2018 |

(Continued)

OTHER PUBLICATIONS

Machine translation of CN 108895593, Nov. 2018.*

(Continued)

*Primary Examiner* — Jonathan Crepeau
(74) *Attorney, Agent, or Firm* — Kilpatrick Townsend & Stockton LLP

(57) ABSTRACT

The present disclosure relates to the technical field of energy storage devices, and provides a battery cell assembly, a battery module, and a battery pack. The battery cell assembly includes: at least two battery cells and an insulation film. The at least two battery cells are stacked. Each battery cell includes an electrode assembly and a battery housing. The electrode assembly is accommodated in the battery housing. The electrode assembly includes a first electrode plate, a second electrode plate, and a separator disposed between the first electrode plate and the second electrode plate. The insulation film surrounds a periphery of the at least two battery cells to wrap the at least two battery cells together.

20 Claims, 12 Drawing Sheets

(51) Int. Cl.
| | |
|---|---|
| *H01M 50/209* | (2021.01) |
| *H01M 50/264* | (2021.01) |
| *H01M 50/289* | (2021.01) |
| *H01M 50/291* | (2021.01) |
| *H01M 50/293* | (2021.01) |
| *H01M 50/502* | (2021.01) |

(52) U.S. Cl.
CPC ....... *H01M 50/264* (2021.01); *H01M 50/289* (2021.01); *H01M 50/291* (2021.01); *H01M 50/293* (2021.01); *H01M 50/502* (2021.01)

(56) References Cited

FOREIGN PATENT DOCUMENTS

| EP | 3641012 A1 | 4/2020 |
|---|---|---|
| EP | 3675224 A1 | 7/2020 |

OTHER PUBLICATIONS

Contemporary Amperex Technology Co., Limited, PCT International Search Report, PCT/CN2019/079584, Sep. 26, 2019, 6 pgs.
Contemporary Amperex Technology Co., Limited, PCT Isa Written Opinion, PCT/CN2019/079584, Sep. 26, 2019, 3 pgs.
English translation of the International Search Report received in the corresponding International Application PCT/CN2019/079584, mailed Sep. 26, 2019.
English translation of the Written Opinion received in the corresponding International Application PCT/CN2019/079584. mailed Sep. 26, 2019.
Notice of Granting Utility Model Patent Right received in the corresponding Chinese Application CN201822274884.6, mailed Aug. 2, 2019.
The first Office Action received in the corresponding European Application 19906932.9, mailed Jul. 28, 2022.
Contemporary Amperex Technology Co., Limited, Extended European Search Report, EP 19906932.9, Jan. 4, 2022, 6 pgs.

* cited by examiner

BATTERY CELL ASSEMBLY, BATTERY MODULE, AND BATTERY PACK

CROSS-REFERENCE TO RELATED APPLICATIONS

The present application is a United States National Stage Application filed under 35 U.S.C. § 371 of PCT Patent Application Serial No. PCT/CN2019/079584, entitled "BATTERY CELL ASSEMBLY, BATTERY MODULE, AND BATTERY PACK," filed Mar. 25, 2019 which claims priority to Chinese Patent Application No. 201822274884.6, filed on Dec. 30, 2018, entitled "BATTERY CELL ASSEMBLY, BATTERY MODULE, AND BATTERY PACK," each of which is incorporated herein by reference in its entirety.

TECHNICAL FIELD

The present disclosure relates to the technical field of energy storage devices, and in particular, to a battery cell assembly, a battery module, and a battery pack.

BACKGROUND

Secondary batteries are widely used in new energy vehicles by virtue of advantages such as a high energy density, a long service life, energy saving, and environmental-friendliness.

In existing technologies, a housing of a battery cell is usually made of a metal material to ensure sufficient strength, and the housing of each battery cell is peripherally coated with an insulation film to meet requirements of the battery cell for insulation. When a plurality of battery cells are assembled into a battery module, the plurality of battery cells need to be stacked. Therefore, at least two insulation films exist between two adjacent battery cells. This not only occupies internal space of the battery pack and affects the energy density of the battery pack, but also increases the amount of consumption of the insulation film.

SUMMARY

In view of the foregoing situation, it is necessary to provide a battery cell assembly to solve the technical problem in existing technologies, that is, at least two insulation films exist between two adjacent battery cells, occupy internal space of a battery pack, and affect an energy density of the battery pack.

To achieve the foregoing objective, a battery cell assembly is provided in some embodiments, including: at least two battery cells, where the at least two battery cells are stacked, each battery cell includes an electrode assembly and a battery housing, the electrode assembly is accommodated in the battery housing, and the electrode assembly includes a first electrode plate, a second electrode plate, and a separator disposed between the first electrode plate and the second electrode plate; and an insulation film, configured to surround a periphery of the at least two battery cells to wrap the at least two battery cells together.

In some embodiments, an insulation piece is disposed between two adjacent battery cells.

In some embodiments, two surfaces of the insulation piece are bonded to the two adjacent battery cells respectively.

In some embodiments, the insulation piece is elastic.

In some embodiments, the battery cell further includes a cover plate. The battery housing has an opening. The battery housing includes one end face, two first lateral faces, and two second lateral faces. Each first lateral face is larger than each second lateral face and larger than the end face in area. First lateral faces of the two adjacent battery cells face to each other. The one end face, the two first lateral faces, and the two second lateral faces define a cavity that accommodates the electrode assembly. The cover plate covers the opening. The battery cell includes a first electrode terminal and a second electrode terminal. The first electrode terminal and the second electrode terminal are disposed on the cover plate.

In some embodiments, the insulation film surrounds first lateral faces, second lateral faces, and end faces of the at least two battery cells.

In some embodiments, the insulation film includes a first adhesive groove. The first adhesive groove faces to the first lateral face. A part of the first lateral face is exposed from the first adhesive groove. The exposed part of the first lateral face is configured to connect to an adhesive.

In some embodiments, the insulation film includes a second adhesive groove. The second adhesive groove faces to the end face. A part of the end face is exposed from the second adhesive groove. The exposed part of the end face is configured to connect to an adhesive.

To solve the foregoing technical problem, another technical solution is provided in some embodiments: a battery module, including at least two battery cell assemblies arranged in a horizontal direction, and a plurality of busbars electrically connected to the plurality of battery cell assemblies, where the battery cell assembly is the battery cell assembly according to any of the foregoing technical solutions.

In some embodiments, a size of the battery module in the horizontal direction is larger than a size of the battery module in a vertical direction. The electrode assembly is of wound structure and is flat. Outer surfaces of the electrode assembly include two flat surfaces that are opposite to each other in the vertical direction. Alternatively, the electrode assembly is of a laminated structure, and a first electrode plate, a separator, and a second electrode plate in stacked in the vertical direction.

To solve the foregoing technical problem, a further technical solution is provided in some embodiments: a battery pack, including: a battery box, defining an accommodation cavity; and a plurality of battery modules according to any of the foregoing technical solutions, where the plurality of battery modules are disposed in the accommodation cavity.

In contrast to existing technologies, the battery cell assembly in the technical solution described above includes at least two battery cells. The insulation film wraps the at least two battery cells together to form a battery cell assembly. Therefore, it is not necessary to provide two insulation films between two adjacent battery cells, which is advantageous not only in increasing an energy density of the battery module and the battery pack, but also in reducing the amount of consumption of the insulation film.

REFERENCE NUMERALS

100. Battery module;
  10. Battery cell assembly;
    1. Battery cell;
      11. Electrode assembly;
        111. First electrode plate;
        112. Second electrode plate;
        113. Separator;
        114. Flat surface;
        115. Narrow surface;
      110. First lateral face;
      120. Second lateral face;
      130. End face;
      12. Battery housing;
      13. Cover plate;
      14. Adapter sheet;
        131. First electrode terminal;
        132. Second electrode terminal;
200. Battery pack;
  210. Lower box;
  220. Upper cover;
  230. Adhesive;
  2. Insulation film;
    21. Second surface;
    22. Third surface;
    23. First surface;
    24. Opening;
  211. First adhesive groove;
  231. Second adhesive groove;
  3. Insulation piece;
    31. Adhesive;
  5. First busbar; and
  6. Second busbar.

DETAILED DESCRIPTION OF EMBODIMENTS

To describe the technical content, structural features, objectives, and effects of the technical solution in detail, the following describes the technical solution in detail with reference to specific embodiments and drawings.

In the context of the present disclosure, unless otherwise expressly specified and defined, the terms "first", "second", and "third" are for the sole purpose of description rather than indicating or implying any order of preference; unless otherwise expressly specified, the term "a plurality of" means two or more; and the terms such as "connect" and "fix" are to be understood in a broad sense. For example, a "connection" may be a fixed connection, or a detachable connection, or an integrated connection, or an electrical connection; and may be a direct connection or an indirect connection implemented through an intermediate medium. A person of ordinary skill in the art can understand the specific meanings of the terms in the present disclosure according to the context.

In the context of the present disclosure, the direction indicated by the arrow A in all drawings is a length direction, the direction indicated by the arrow B is a width direction, and the direction indicated by the arrow C is a vertical direction. The horizontal direction is a direction parallel to a horizontal plane, and may be the length direction or the width direction. In addition, the horizontal direction includes not only a direction absolutely parallel to the horizontal plane, but also a direction substantially parallel to the horizontal plane in a general sense of engineering. The vertical direction is a direction perpendicular to the horizontal plane. The vertical direction includes not only a direction absolutely perpendicular to the horizontal plane, but also a direction substantially perpendicular to the horizontal plane in a general sense of engineering. In addition, directional terms such as "upper", "lower", "top", and "bottom" described in the present disclosure are all understood with respect to the vertical direction.

Figure 1:
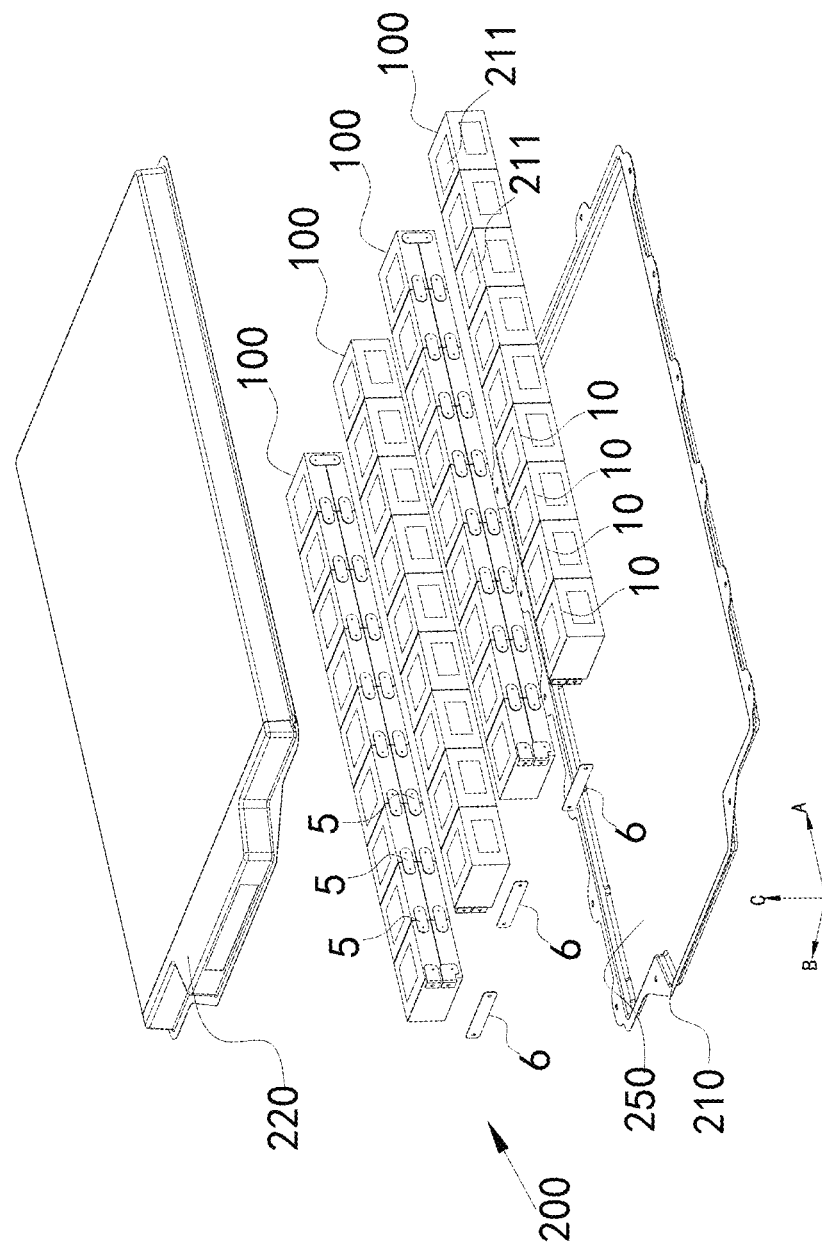
FIG. 1 is a schematic structural diagram of a battery pack according to an embodiment.

Referring to FIG. 1, which is a schematic structural diagram of a battery pack 200 according to an embodiment, the battery pack 200 includes a battery box 20 and a plurality of battery modules 100. The battery box 20 includes a lower box 210 and an upper cover 220. In FIG. 1, the upper cover 220 of the battery pack 200 is separated from the lower body 210. The lower box 210 fits with the upper cover 220 to form a hermetically closed battery box defining an accommodation cavity 250. A plurality of battery modules 100 are disposed in the accommodation cavity 250. The battery box 20 may be made of aluminum, aluminum alloy, or other metal materials. The plurality of battery modules 100 may be arranged alongside each other in a length direction of the battery pack 200. The plurality of battery modules 100 may further be arranged alongside each other in a width direction of the battery pack 200. The battery module 100 includes a plurality of battery cell assemblies 10 arranged in a horizontal direction and a plurality of first busbars 5 electrically connected to the plurality of battery cell assemblies 10. Two adjacent battery modules 100 may be electrically connected to each other by a second busbar 6.

Figure 2A:
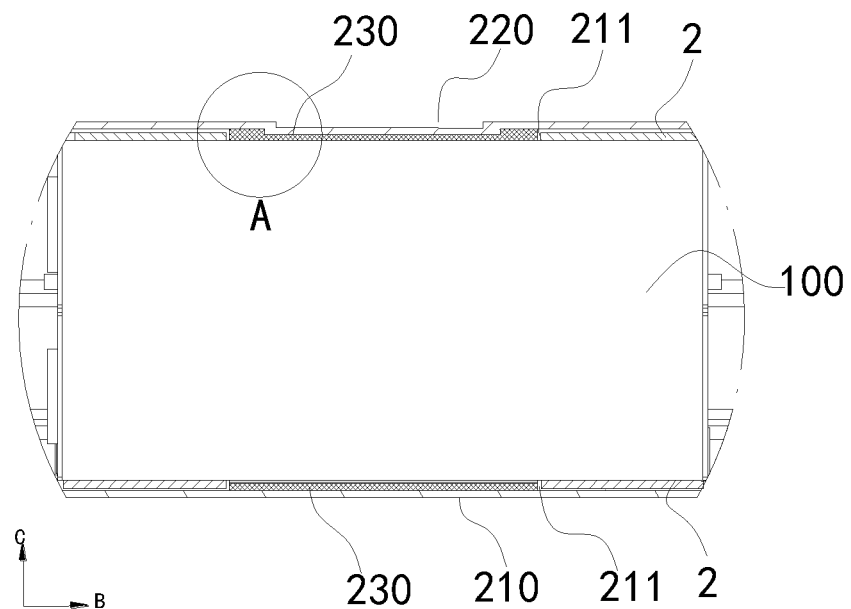
FIG. 2*a* is a schematic diagram of a battery module bonded to a battery box according to an embodiment.
Figure 2B:
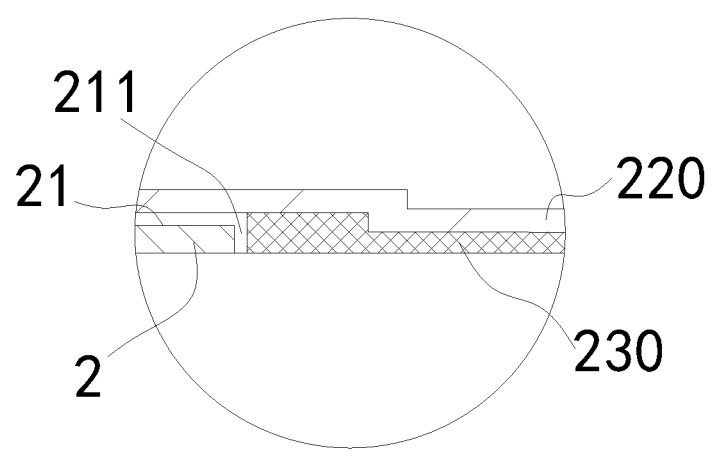
FIG. 2*b* is a local detailed view of a part A shown in FIG. 2*a*.

Referring to FIG. 2a and FIG. 2b, FIG. 2a is a schematic diagram of a battery module bonded to a battery box, and FIG. 2b is a local detailed view of a part A shown in FIG. 2a. The battery module 100 includes a plurality of battery cell assemblies 10. An insulation film 2 is provided on a surface of each battery cell assembly 10. A second surface 21 of the insulation film 2 faces to a bottom wall of the battery box 20 or a top wall of the battery box 20. That is, the second surface 21 of the insulation film 2 is oriented in a direction of an arrow C in the drawing. A first adhesive groove 211 is defined on the second surface 21 of the insulation film 2. An adhesive 230 is filled in the first adhesive groove 211. The battery module 100 is bonded to the battery box 20 by the adhesive 230. The battery module 100 is connected to the battery box 20 by the adhesive 230, so that the battery module 100 and the battery box 20 form a whole. This increases connection strength between the battery box 20 and the battery module 100, and improves overall rigidity of the battery pack 200. In consideration of a relatively smooth surface of the insulation film 2 which may weaken bonding strength between the battery module 100 and the battery box 20, in this embodiment, the first adhesive groove 211 is defined on the insulation film 2 of the battery cell assembly 10. A part of a battery housing 12, to which the second surface 21 of the insulation film 2 faces, is exposed from the first adhesive groove 211. The exposed part of the battery housing 12 is configured to connect to the adhesive, thereby increasing bonding strength between the battery cell assembly 10 and adhesive 230. In addition, the first adhesive groove 211 can prevent the adhesive 230 from overflowing outward when the adhesive is not solidified.

Figure 3:
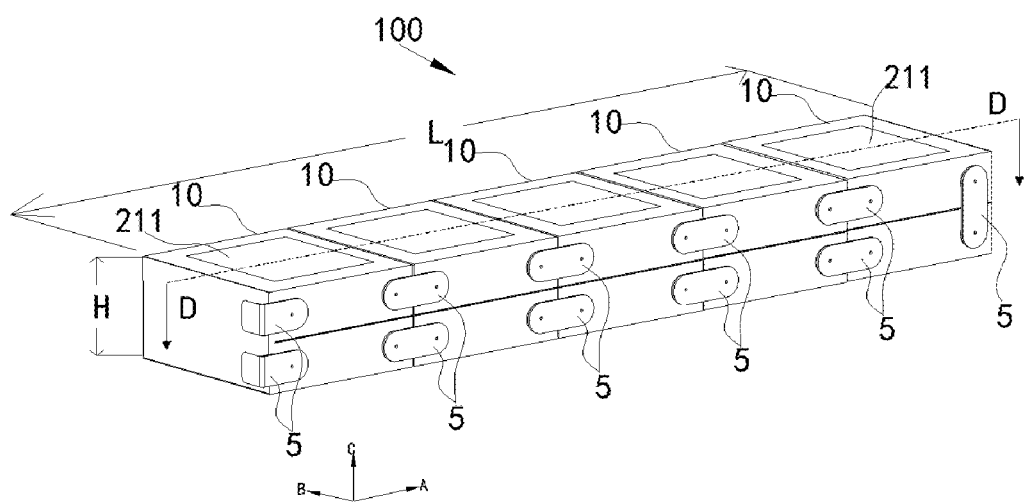
FIG. 3 is a schematic structural diagram of a battery module according to an embodiment.

Referring to FIG. 3, in an embodiment, a battery module 100 is provided. The battery module 100 includes a plurality of battery cell assemblies 10 arranged in a horizontal direction and a plurality of first busbars 5 electrically connected to the plurality of battery cell assemblies 10. The battery cell assemblies 10 may be connected in series, in parallel or in both series and parallel through the first busbar 5.

Figure 4:
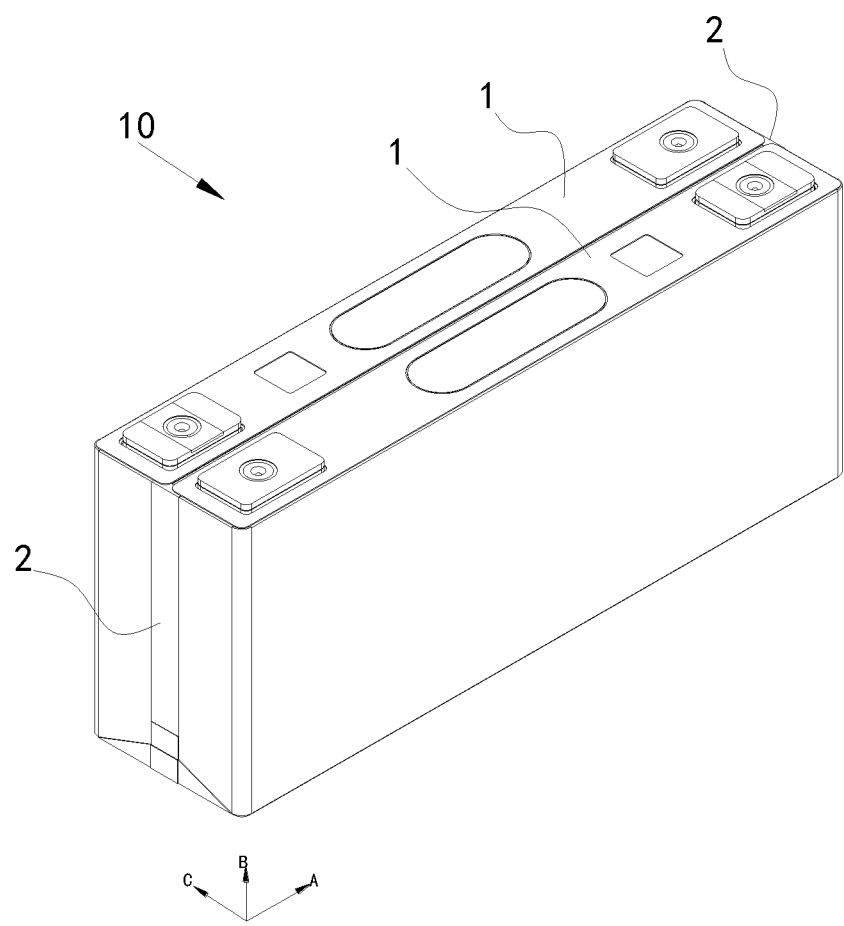
FIG. 4 is a schematic structural diagram of a battery cell assembly according to an embodiment.
Figure 5:
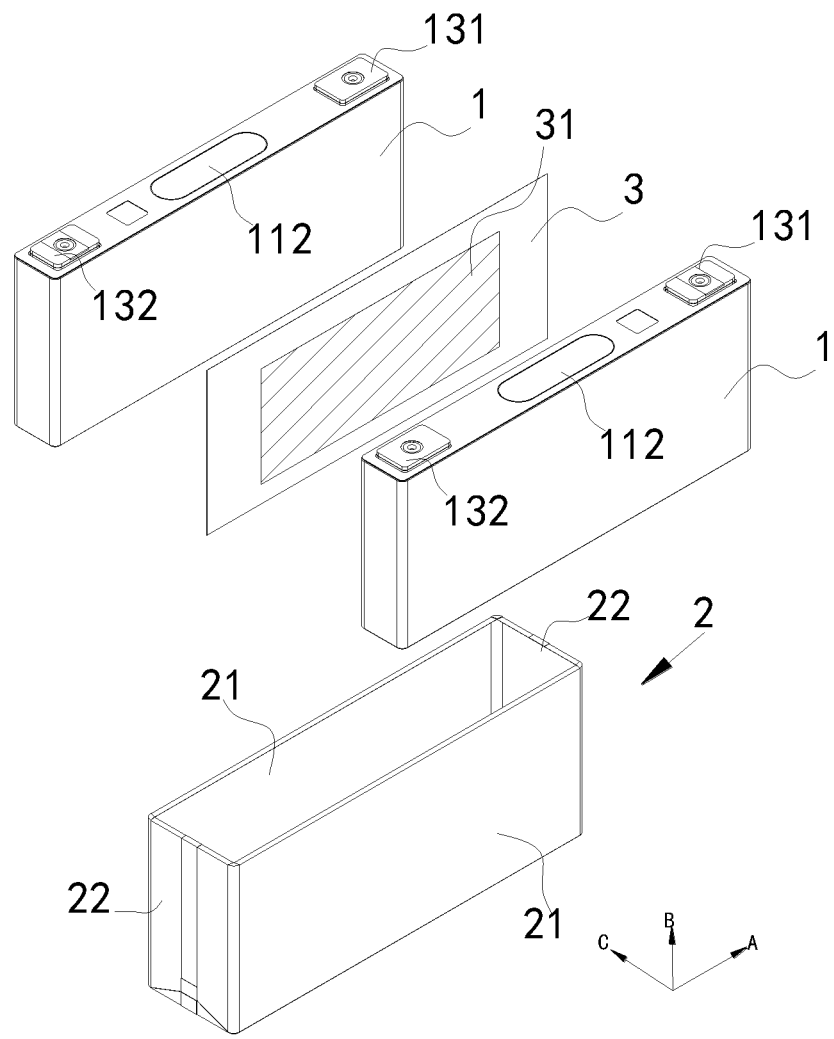
FIG. 5 is an exploded view of a battery cell assembly according to an embodiment.

Referring to FIG. 4 and FIG. 5, in an embodiment, a battery cell assembly 10 is provided. FIG. 4 is a schematic structural diagram of the battery cell assembly 10; and FIG. 5 is an exploded view of the battery cell assembly 10. The battery cell assembly 10 includes at least two battery cells 1, an insulation film 2, and an insulation piece 3.

The at least two battery cells 1 are stacked. The insulation piece 3 is disposed between two adjacent battery cells 1 to prevent electrical connection between housings 12 of the two adjacent battery cells 1. Each battery cell 1 may be of a hexahedral structure or other structures similar to a hexahedron. The insulation piece 3 may be of a sheet-shaped structure. For example, the insulation piece 3 may be made of an elastic insulation material such as rubber and silicone. The elastic insulation piece 3 not only serves to implement insulation between the two adjacent battery cells 1, but also absorbs an expansion force generated by the battery cells 1 during operation.

As shown in FIG. 5, in an embodiment, two opposing surfaces of the insulation piece 3 are each provided thereon with an adhesive 31. The insulation piece 3 is bonded to the two adjacent battery cells 1 together through the adhesive 31, thereby increasing overall structural strength of the battery cell assembly 10. For example, the insulation piece 3 may be centrally hollowed out, so that the adhesive 31 runs through the insulation piece 3 to directly bond the battery housings 12 of the two adjacent battery cells 1.

The insulation film 2 surrounds a periphery of the at least two battery cells 1 to wrap the at least two battery cells 1 together so as to form a whole. The insulation film 2 surrounds first lateral faces 110, second lateral faces 120, and end faces 130 of the at least two battery cells 1. The at least two battery cells 1 may be stacked, and then the insulation film 2 winds around the periphery of the at least two stacked battery cells 1, so that exposed surfaces of the battery housing 12 are wrapped by the insulation film 2.

Figure 6:
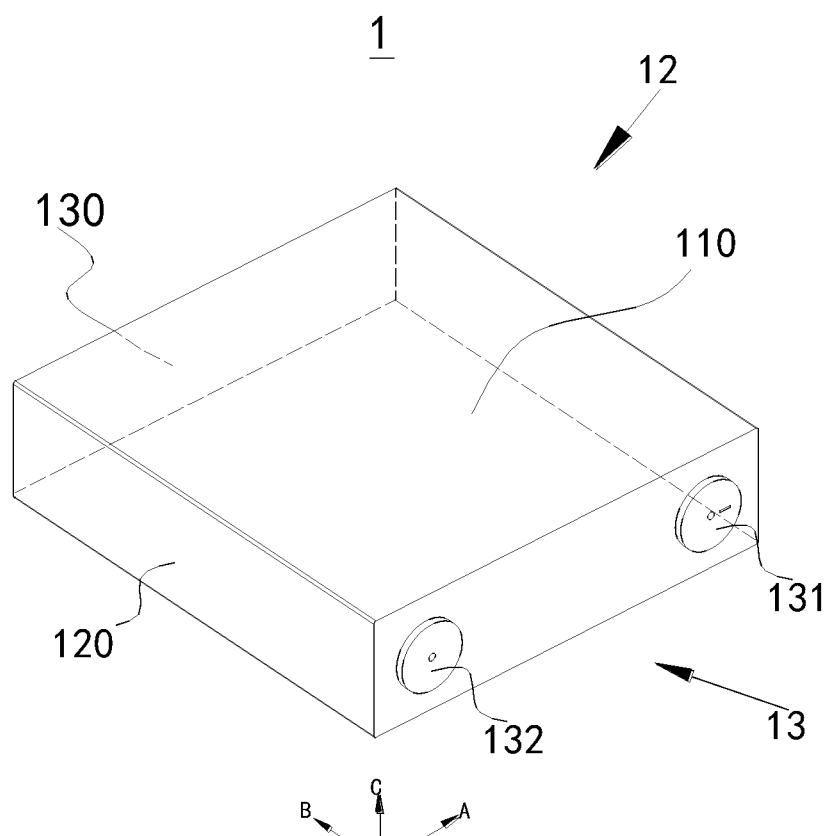
FIG. 6 is a schematic structural diagram of a battery cell according to an embodiment.
Figure 7:
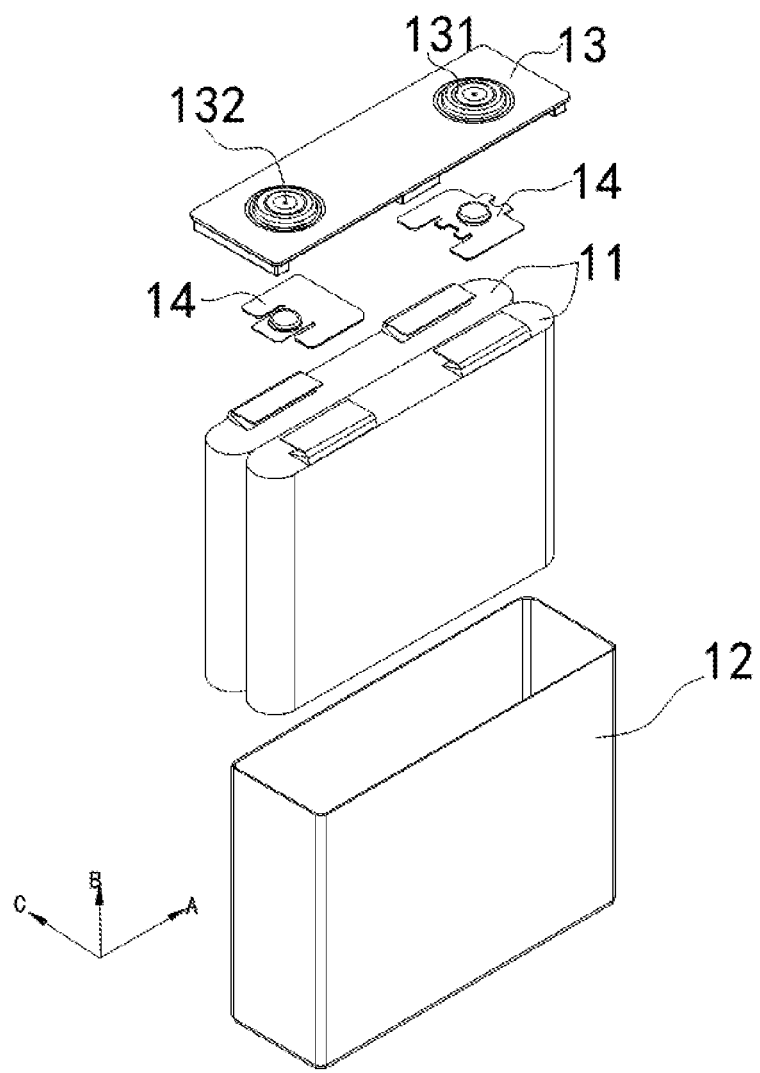
FIG. 7 is an exploded view of a battery cell according to an embodiment.
Figure 8:
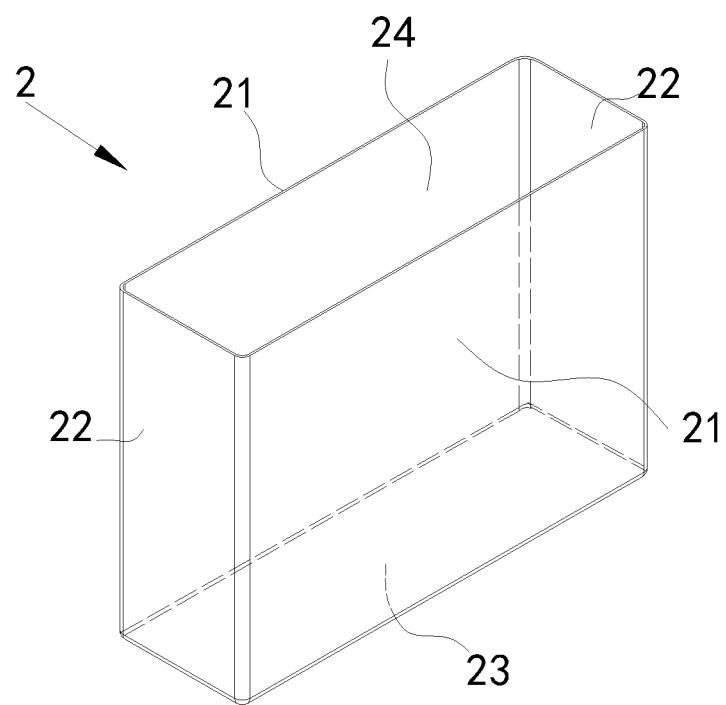
FIG. 8 is a schematic structural diagram of an insulation film according to an embodiment.

Refer to FIG. 6 to FIG. 8, FIG. 6 is a schematic structural diagram of the battery cell 1, and FIG. 7 is an exploded view of the battery cell 1.

The battery cell 1 includes a battery housing 12, an electrode assembly 11, and a cover plate 13. The battery housing 12 may be made of a metal material such as aluminum, aluminum alloy, or nickel-plated steel. The battery housing 12 may be of a hexahedral shape or another shape, and includes an opening 24. The electrode assembly 11 is accommodated in the battery housing 12. The opening 24 of the battery housing 12 is covered with a cover plate 13. The cover plate 13 is provided thereon with two electrode terminals, i.e., a first electrode terminal 131 and a second electrode terminal 132. The first electrode terminal 131 may be a positive electrode terminal, and the second electrode terminal 132 may be a negative electrode terminal. In other embodiments, the first electrode terminal 131 may be a negative electrode terminal, and the second electrode terminal 132 may be a positive electrode terminal. The cover plate 13 may be made of a metal material such as aluminum, aluminum alloy or the like. A size of the cover plate 13 fits a size of the opening 24. The electrode terminals may be fixed onto the cover plate 13 by welding or by using a fastener such as a rivet. An adapter sheet 14 is disposed between the cover plate 13 and the electrode assembly 11. Tabs of the electrode assembly 11 are electrically connected to the electrode terminals on the cover plate 13 through the adapter sheet 14. In this embodiment, there are two adapter sheets 14: a positive adapter sheet and a negative adapter sheet.

Figure 11:
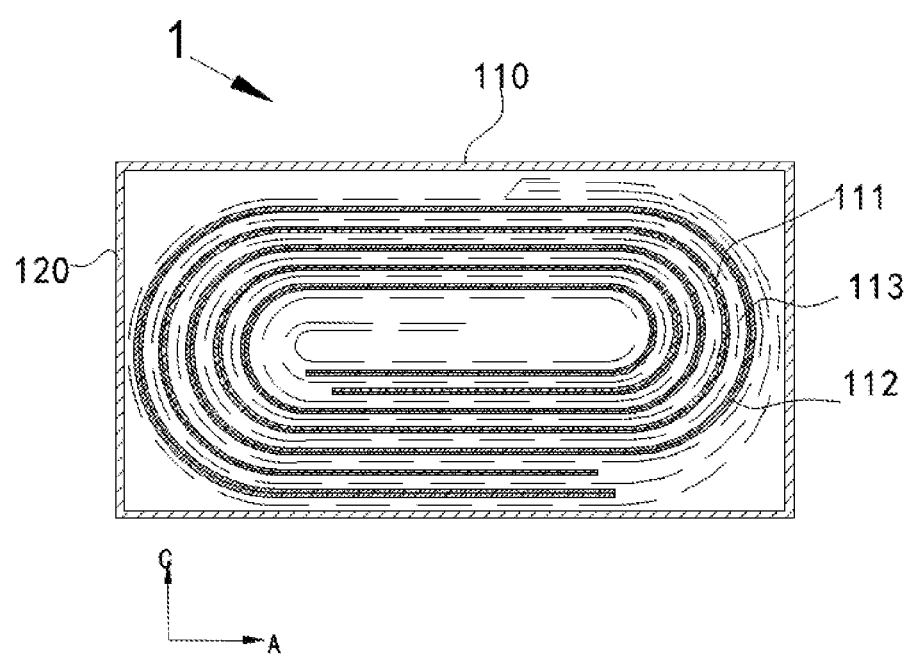
FIG. 11 is a cross-sectional view of a battery cell with a wound electrode assembly taken along a D-D direction shown in FIG. 3 according to an embodiment.
Figure 12:
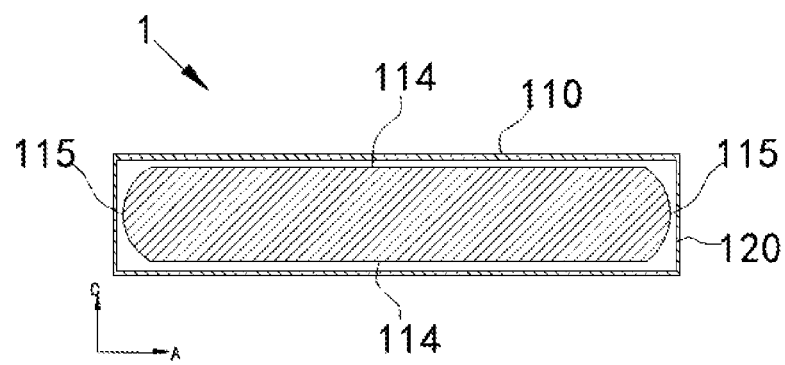
FIG. 12 is a schematic outline of a cross section of a battery cell with a wound electrode assembly taken along a D-D direction shown in FIG. 3 according to an embodiment.
Figure 13:
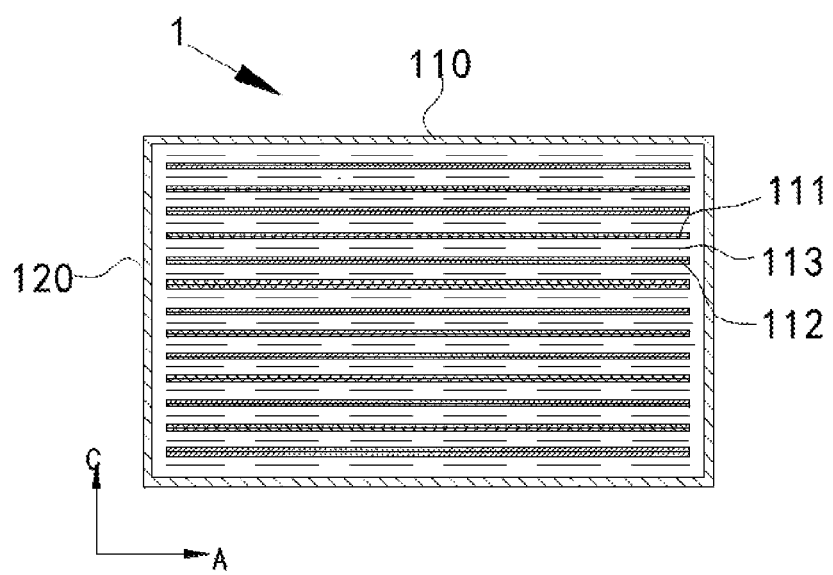
FIG. 13 is a cross-sectional view of a battery cell with a laminated electrode assembly sectioned along a D-D direction shown in FIG. 3 according to an embodiment.

Referring to FIG. 11 to FIG. 13, the electrode assembly 11 includes a first electrode plate 111, a second electrode plate 112, and a separator 113 disposed between the first electrode plate 111 and the second electrode plate 112. The first electrode plate 111 may be a positive electrode plate and the second electrode plate 112 may be a negative electrode plate. In other embodiments, the first electrode plate 111 may be a negative electrode plate, and the second electrode plate may be a positive electrode plate. The separator 113 is an insulator between the first electrode plate 111 and the second electrode plate 112. An active material of the positive electrode plate may be coated onto a coated region of the positive electrode plate, and an active material of the negative electrode plate may be coated onto a coated region of the negative electrode plate. A part extending out from the coated region of the positive electrode plate serves as a positive tab, and a part extending out from the coated region of the negative electrode plate serves as a negative tab. The positive tab is connected to the positive electrode terminal on the cover plate 13 through the positive adapter sheet. Likewise, the negative tab is connected to the negative electrode terminal on the cover plate 13 through the negative adapter sheet.

Two electrode assemblies 11 are provided in the battery housing 12. In other embodiments, merely one electrode assembly 11 may be provided in the battery housing 12, or at least three electrode assemblies 11 may be provided in the battery housing 12.

As shown in FIG. 6, the battery housing 12 of the battery cell 1 is of a substantially hexahedral structure. The battery housing 12 includes two first lateral faces 110, two second lateral faces 120, and one end face 130. The first lateral face 110 is larger than the second lateral face 120 and larger than the end face 130 in area. The end face 130 is an end face opposite to the cover plate 13. The first lateral face 110 of the battery housing 12 forms the first lateral face 110 of the battery cell 1. The second lateral face 120 of the battery housing 12 forms the second lateral face 120 of the battery cell 1. The end face 130 of the battery housing 12 forms the end face 130 of the battery cell 1.

For example, in the battery module 100, at least two battery cells 1 are stacked, and first lateral faces 110 of two adjacent battery cells 1 face to each other. For example, in each battery cell 1, two second lateral faces 120 are opposite to each other in a horizontal direction (for example, a length direction indicated by an arrow A). The two first lateral faces 110 are opposite to each other in a vertical direction (a direction indicated by an arrow C). The first lateral face 110 may transition to the second lateral face 120 through a right angle. Likewise, the first lateral face 110 may also transition to the second lateral face 120 through a circular arc surface or a poly-bent curved surface.

In this embodiment, the insulation film wraps the at least two battery cells 1 together to form the battery cell assembly 10. Therefore, it is not necessary to provide two insulation films between two adjacent battery cells 1, which is advantageous not only in increasing the energy density of the battery module 100 and the battery pack 200, but also in reducing the amount of consumption of the insulation film 2. In this embodiment, the battery cell assembly 10 contains at least two battery cells 1. In other embodiments, the quantity of the battery cells 1 may be three or more. For example, the quantity of the battery cells 1 in the battery cell assembly 10 is two to four. That is, the battery cells 1 are stacked in no more than 4 layers.

In the embodiment shown in FIG. 5, an insulation piece 3 is disposed between two adjacent battery cells 1. Alternatively, in some embodiments where the battery cells in an identical battery cell assembly may be connected in parallel with each other, no insulation piece 3 is required to be disposed between adjacent battery cells 1, and instead, the housings 12 of the adjacent battery cells 1 are directly abutted together.

Refer to FIG. 8, which is a schematic structural diagram of the insulation film 2. Similar to the shape of the housing 12 of the battery cell 1, the insulation film 2 is of a substantially hexahedral structure, and includes an opening. The insulation film 2 includes one first surface 23, two second surfaces 21, and two third surfaces 22. The two second surfaces 21 are opposite to each other. The two third surfaces 22 are opposite to each other. The first surfaces 23, the second surfaces 21, and the third surfaces 22 are pairwise connected to each other and substantially perpendicular to each other. The first surface 23, the two second surfaces 21, and the two third surfaces 22 jointly define a cavity that accommodates at least two battery cells 1. The first surface 23 is opposite to the end face 130 of the battery cell 1. Each second surface 21 is opposite to the corresponding first lateral face 110. Each third surface 22 is opposite to the corresponding second lateral face 120.

Figure 9:
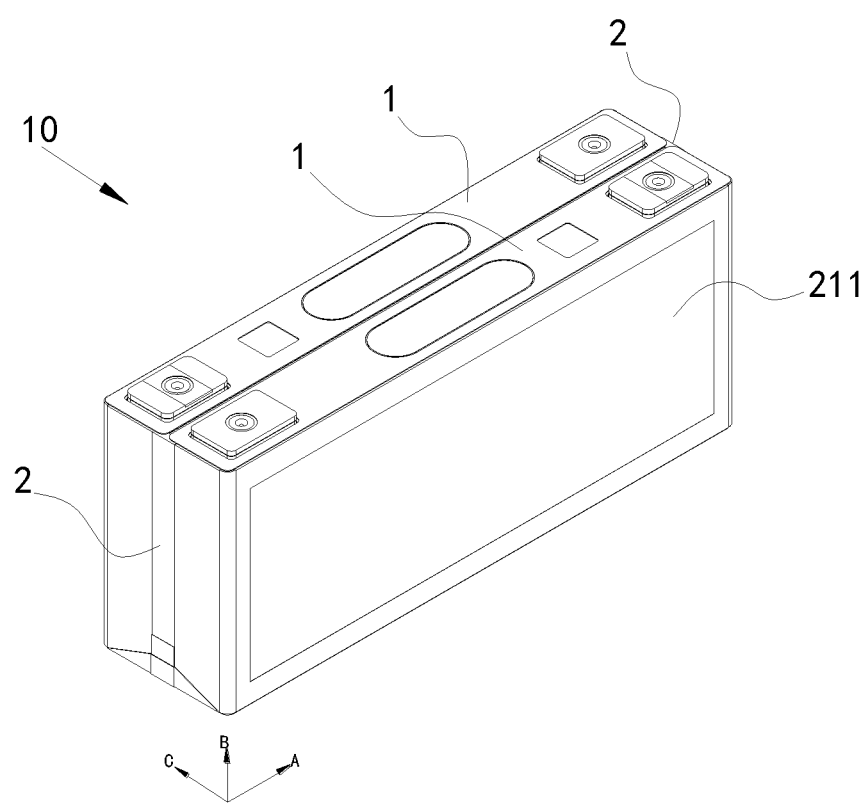
FIG. 9 is a schematic structural diagram of a battery cell assembly according to another embodiment.
Figure 10:
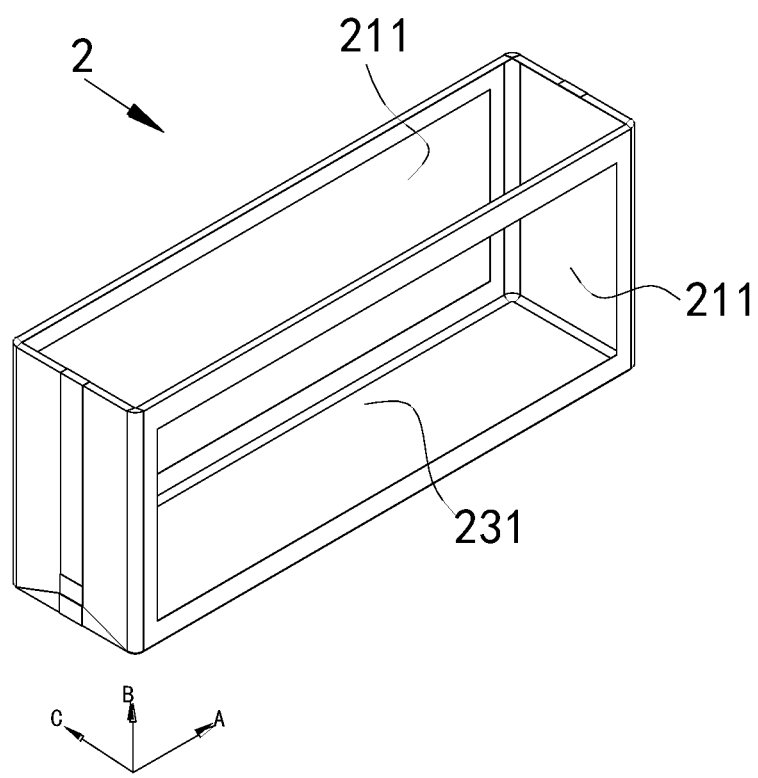
FIG. 10 is a schematic structural diagram of an insulation film according to an embodiment.

Refer to FIG. 9 and FIG. 10, FIG. 9 is a schematic structural diagram of a battery cell assembly according to another embodiment, and FIG. 10 is a schematic structural diagram of an insulation film in this embodiment. The battery cell assembly in this embodiment is different from the battery cell assembly in the embodiment shown in FIG. 4 in: a first adhesive groove 211 is defined on the insulation film 2 in the battery cell assembly 10 shown in FIG. 9. The first adhesive groove 211 is located on the second surface 21 of the insulation film 2, that is, on a surface facing to the first lateral face 110 of the battery cell 1. The insulation film at the location of the first adhesive groove 211 is removed, so that a part of the first lateral face 110 is exposed from the first adhesive groove 211. The exposed part of the first lateral face 110 is configured to bond to an adhesive. The first adhesive groove 211 is configured to be filled with an adhesive 230. The adhesive 230 is in contact with the exposed part of the first lateral face 110. As shown in FIG. 1, FIG. 2, and FIG. 3, in the battery pack 200, the first adhesive groove 211 on the insulation film 2 faces to the upper cover 220 or the lower box 210 of the battery box 20. A top face of the battery cell assembly 10 may be directly bonded to the upper cover 220 by the adhesive 230. Likewise, a bottom face of the battery cell assembly 10 may be directly bonded to the lower box 210 by the adhesive 230. For example, the adhesive 230 is a structural adhesive.

As shown in FIG. 10, in another embodiment, a second adhesive groove 231 may be further defined on the insulation film 2. The second adhesive groove 231 is located on the first surface 23 of the insulation film 2 (that is, a surface facing the end face 130 of the battery housing 12). A part of the end face 130 is exposed from the second adhesive groove 231. The exposed part of the end face 130 is configured to bond to the adhesive. The adhesive may be filled in the second adhesive groove 231. The adhesive 230 is in contact with the exposed part of the end face 130.

As shown in FIG. 3, a size L of the battery module 100 in the horizontal direction is larger than a size H of the battery module 100 in the vertical direction. The electrode assembly 11 of the battery cell 1 may be of a wound structure shown in FIG. 11, or, the electrode assembly 11 may be of a laminated structure shown in FIG. 13.

As shown in FIG. 11, the first electrode plate 111, the separator 113, and the second electrode plate 112 are each of a strap-shaped structure. The first electrode plate 111, the separator 113, and the second electrode plate 112 are sequentially stacked and wound at least twice to form an electrode assembly 11. The electrode assembly 11 is flat. During preparation of the electrode assembly 11, the electrode assembly 11 may be wound into a hollow cylindrical structure first, and then calendered into a flat shape. FIG. 12 is a schematic outline of the battery cell 1. Outer surfaces of the electrode assembly 11 include two flat surfaces 114. The two flat surfaces 114 are opposite to each other in the vertical direction (the direction indicated by the arrow C). That is, the flat surfaces 114 face to the first lateral faces 110 of the battery housing 12. The electrode assembly 11 is of a substantially hexahedral structure. The flat surfaces 114 are substantially parallel to a winding axis and are largest in area among outer surfaces. The flat surfaces 114 may be surfaces that are relatively flat, but not necessarily exactly planar. The two flat surfaces 114 are termed in relation to narrow surfaces 115 on both sides of the electrode assembly 11. The flat surfaces 114 are larger than the narrow surfaces 115 of the electrode assembly 11 in area.

As shown in FIG. 13, the electrode assembly 11 is of a laminated structure. To be specific, the electrode assembly 11 includes a plurality of first electrode plates 111, a plurality of second electrode plates 112, and a plurality of separators each of which is disposed between a respective one of the first electrode plates 111 and a respective one of the second electrode plates 112. The first electrode plates 111, the separators 113, and the second electrode plates 112 are stacked sequentially. The first electrode plates 111, the separators 113, and the second electrode plates 112 are stacked in the vertical direction (the direction indicated by the arrow C).

The electrode assembly 11 may inevitably expand in a thickness direction of the electrode plate during charge and discharge (in the electrode assembly 11 of the wound structure, an expansion force is greatest in a direction perpendicular to the flat surfaces 114; and, in the electrode assembly 11 of the laminated structure, the expansion force is greatest in a stacking direction of the first electrode plate 111 and the second electrode plate 112).

By contrast, in the battery cell 1 of the battery module 100 and the battery cell assembly 10 in existing technologies, the electrode assembly 11 applies a greatest expansion force onto the battery housing 12 in the horizontal direction. The size of the battery module 100 in the horizontal direction is much larger than the size in the vertical direction (for example, as limited by a height of a vehicle chassis, more battery cells 1 need to be stacked in the horizontal direction, thereby accumulating a large expansion force). Therefore, the battery module 100 in existing technologies bears an extremely large expansion force in the horizontal direction, and it is thus necessary to dispose considerably thick end plates on two sides of the battery module 100 in the horizontal direction to resist the expansion force. The thick end plates reduce the energy density of the battery module 100. In this embodiment of the present disclosure, the electrode assembly 11 may be of the wound structure or the laminated structure. When the electrode assembly 11 is of the wound structure, the flat surfaces 114 are oriented toward the vertical direction. When the electrode assembly is of the laminated structure, the first electrode plate 111 and the second electrode plate 112 are stacked in the vertical direction. Evidently, no matter whether the electrode assembly 11 is of the wound structure or the laminated structure, the electrode assembly 11 applies the greatest expansion force onto the battery housing 12 in the vertical direction.

The electrode assembly 11 applies the greatest expansion force onto the battery housing 12 in the vertical direction, and fewer battery cells 1 are stacked in the vertical direction. Therefore, compared with existing technologies, the greatest expansion force of the battery module 100 is reduced in the present disclosure. Therefore, ends plate that are smaller in size can be selected to increase the energy density of the battery module 100.

As shown in FIG. 3, in the battery module 100, the battery cells 1 in the battery cell assembly 10 are stacked in the vertical direction (the direction indicated by the arrow C) in two layers. In other embodiments, the battery cells 1 may be stacked in the vertical direction in one layer to five layers. For example, the battery cells 1 may be stacked in the vertical direction in two or three layers.

As shown in FIG. 6, the two second lateral faces 120 in the battery cell 1 are opposite to each other in the horizontal direction (for example, the length direction indicated by the arrow A). The two first lateral faces 110 in the battery cell 1 are opposite to each other in the vertical direction (the direction indicated by the arrow C). For example, the first lateral faces 110 are larger than the second lateral faces 120 in area.

The battery cell 1 may generate gas inside the battery housing 12 during charge and discharge, and therefore, the generated gas may apply a force onto the battery housing 12, thereby exacerbating outward expansion of the battery housing 12. In this embodiment, the first lateral faces 110 are larger than the second lateral faces 120 in area, and the two first lateral faces 110 in the battery cell 1 are opposite to each other in the vertical direction. Therefore, the generated gas may apply a greatest force onto the battery housing 12 in the vertical direction. Compared with existing technologies, the greatest expansion force of the battery module 100 is further reduced in the present disclosure.

It should be noted that although the foregoing embodiments have been described herein, the patent protection scope of the present disclosure is not limited to the embodiments. Therefore, any changes and modifications made to the embodiments hereof based on the innovative concept of the present disclosure, any equivalent structural alterations or equivalent process alterations made by using the content of the specification and drawings of the present disclosure, and any direct or indirect application of the foregoing technical solutions to any other related technical fields, fall within the patent protection scope of the present disclosure.

What is claimed is:

1. A battery cell assembly, comprising:
   at least two battery cells, wherein the at least two battery cells are stacked, each battery cell of the at least two battery cells comprises an electrode assembly and a battery housing, the electrode assembly is accommodated in the battery housing, and the electrode assembly comprises a first electrode plate, a second electrode plate, and a separator disposed between the first electrode plate and the second electrode plate; and
   an insulation film, configured to surround a periphery of the at least two battery cells to wrap the at least two battery cells together; and, wherein
   each of the at least two battery cells further comprises a cover plate, the battery housing has an opening, the battery housing comprises one end face, two first lateral faces, and two second lateral faces, each of the two first lateral faces is larger than each of the two second lateral faces and larger than the end face in area, two first lateral faces of two adjacent battery cells of the at least two battery cells face to each other, and the one end face, the two first lateral faces, and the two second lateral faces define a cavity that accommodates the electrode assembly, wherein the insulation film comprises a first adhesive groove, the first adhesive groove faces to the first lateral face, a part of the first lateral face is exposed from the first adhesive groove, and the exposed part of the first lateral face is configured to connect to an adhesive.

2. The battery cell assembly according to claim 1, wherein an insulation piece is disposed between two adjacent battery cells of the at least two battery cells.

3. The battery cell assembly according to claim 2, wherein two surfaces of the insulation piece are bonded to the two adjacent battery cells of the at least two battery cells respectively.

4. The battery cell assembly according to claim 2, wherein the insulation piece is elastic.

5. The battery cell assembly according to claim 1, wherein the cover plate covers the opening, each of the at least two battery cells comprises a first electrode terminal and a second electrode terminal, and the first electrode terminal and the second electrode terminal are disposed on the cover plate.

6. The battery cell assembly according to claim 1, wherein the insulation film surrounds the first lateral faces, the second lateral faces, and the end faces of the at least two battery cells.

7. The battery cell assembly according to claim 1, wherein the insulation film comprises a second adhesive groove, the second adhesive groove faces to the end face, a part of the end face is exposed from the second adhesive groove, and the exposed part of the end face is configured to connect to an adhesive.

8. A battery module, comprising at least two battery cell assemblies arranged in a horizontal direction, and a plurality of busbars electrically connected to the at least two battery cell assemblies, wherein each of the at least two battery cell assemblies comprises:
   at least two battery cells, wherein the at least two battery cells are stacked, each of the at least two battery cell comprises an electrode assembly and a battery housing, the electrode assembly is accommodated in the battery housing, and the electrode assembly comprises a first electrode plate, a second electrode plate, and a separator disposed between the first electrode plate and the second electrode plate; and an insulation film, configured to surround a periphery of the at least two battery cells to wrap the at least two battery cells together, wherein each of the at least two battery cells further comprises a cover plate, the battery housing has an opening, the battery housing comprises one end face, two first lateral faces, and two second lateral faces, each of the two first lateral faces is larger than each of the two second lateral faces and larger than the end face in area, two first lateral faces of two adjacent battery cells of the at least two battery cells face to each other, and the one end face, the two first lateral faces, and the two second lateral faces define a cavity that accommodates the electrode assembly, wherein the insulation film comprises a first adhesive groove, the first adhesive groove faces to the first lateral face, a part of the first lateral face is exposed from the first adhesive groove, and the exposed part of the first lateral face is configured to connect to an adhesive.

9. The battery module according to claim 8, wherein a size of the battery module in the horizontal direction is larger than a size of the battery module in a vertical direction, the electrode assembly is of a wound structure and is flat, outer surfaces of the electrode assembly comprise two flat surfaces that are opposite to each other in the vertical direction; or, the electrode assembly is of a laminated stacked structure, and the first electrode plate, the separator, and the second electrode plate are stacked in the vertical direction.

10. A battery pack, comprising:
a battery box, defining an accommodation cavity; and
a plurality of battery modules, wherein the plurality of battery modules are disposed in the accommodation cavity, each of the plurality of battery modules comprises at least two battery cell assemblies arranged in a horizontal direction, and a plurality of busbars electrically connected to the at least two battery cell assemblies, and each of the at least two battery cell assemblies comprises:
at least two battery cells, wherein the at least two battery cells are stacked, each of the at least two battery cell comprises an electrode assembly and a battery housing, the electrode assembly is accommodated in the battery housing, and the electrode assembly comprises a first electrode plate, a second electrode plate, and a separator disposed between the first electrode plate and the second electrode plate; and
an insulation film, configured to surround a periphery of the at least two battery cells to wrap the at least two battery cells together; and, wherein
each of the at least two battery cells further comprises a cover plate, the battery housing has an opening, the battery housing comprises one end face, two first lateral faces, and two second lateral faces, each of the two first lateral faces is larger than each of the two second lateral faces and larger than the end face in area, two first lateral faces of two adjacent battery cells of the at least two battery cells face to each other, and the one end face, the two first lateral faces, and the two second lateral faces define a cavity that accommodates the electrode assembly, wherein the insulation film comprises a first adhesive groove, the first adhesive groove faces to the first lateral face, a part of the first lateral face is exposed from the first adhesive groove, and the exposed part of the first lateral face is configured to connect to an adhesive.

11. The battery module according to claim 8, wherein an insulation piece is disposed between two adjacent one of the at least two battery cells.

12. The battery module according to claim 11, wherein two surfaces of the insulation piece are bonded to the two adjacent one of the at least two battery cells respectively.

13. The battery module according to claim 11, wherein the insulation piece is elastic.

14. The battery module according to claim 8, wherein
the cover plate covers the opening, each of the at least two battery cells comprise a first electrode terminal and a second electrode terminal, and the first electrode terminal and the second electrode terminal are disposed on the cover plate.

15. The battery module according to claim 8, wherein the insulation film surrounds the first lateral faces, second lateral faces, and end faces of the at least two battery cells.

16. The battery module according to claim 8, wherein the insulation film comprises a second adhesive groove, the second adhesive groove faces to the end face, a part of the end face is exposed from the second adhesive groove, and the exposed part of the end face is configured to connect to an adhesive.

17. The battery pack according to claim 10, wherein an insulation piece is disposed between two adjacent battery cells of the at least two battery cells.

18. The battery pack according to claim 17, wherein two surfaces of the insulation piece are bonded to the-two adjacent battery cells of the at least two battery cells respectively.

19. The battery pack according to claim 10, wherein
the cover plate covers the opening, each of the at least two battery cells comprises a first electrode terminal and a second electrode terminal, and the first electrode terminal and the second electrode terminal are disposed on the cover plate.

20. The battery pack according to claim 10, wherein the insulation film comprises a second adhesive groove, the second adhesive groove faces to the end face, a part of the end face is exposed from the second adhesive groove, and the exposed part of the end face is configured to connect to an adhesive.

* * * * *